Jan. 2, 1945. P. O. CHAMBERS 2,366,685
TIRE BUFFING AND REBUILDING MACHINE
Filed July 8, 1941 5 Sheets-Sheet 2
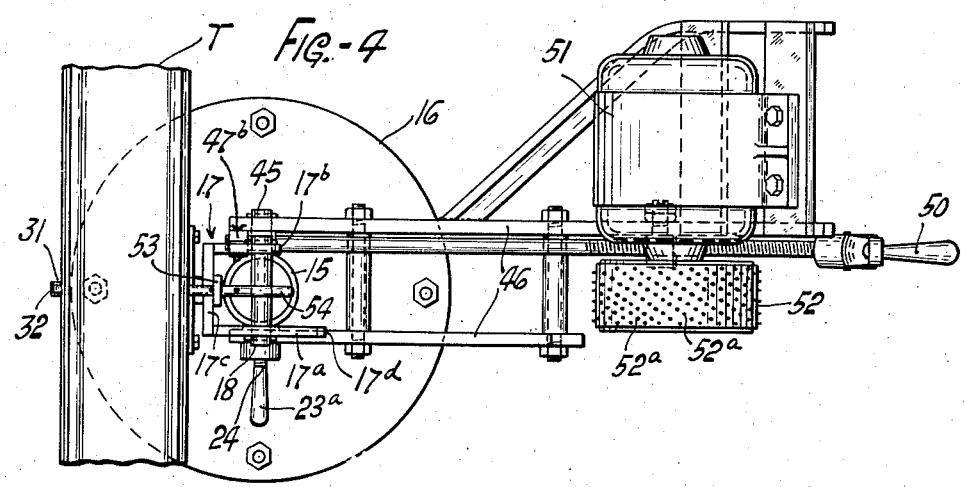
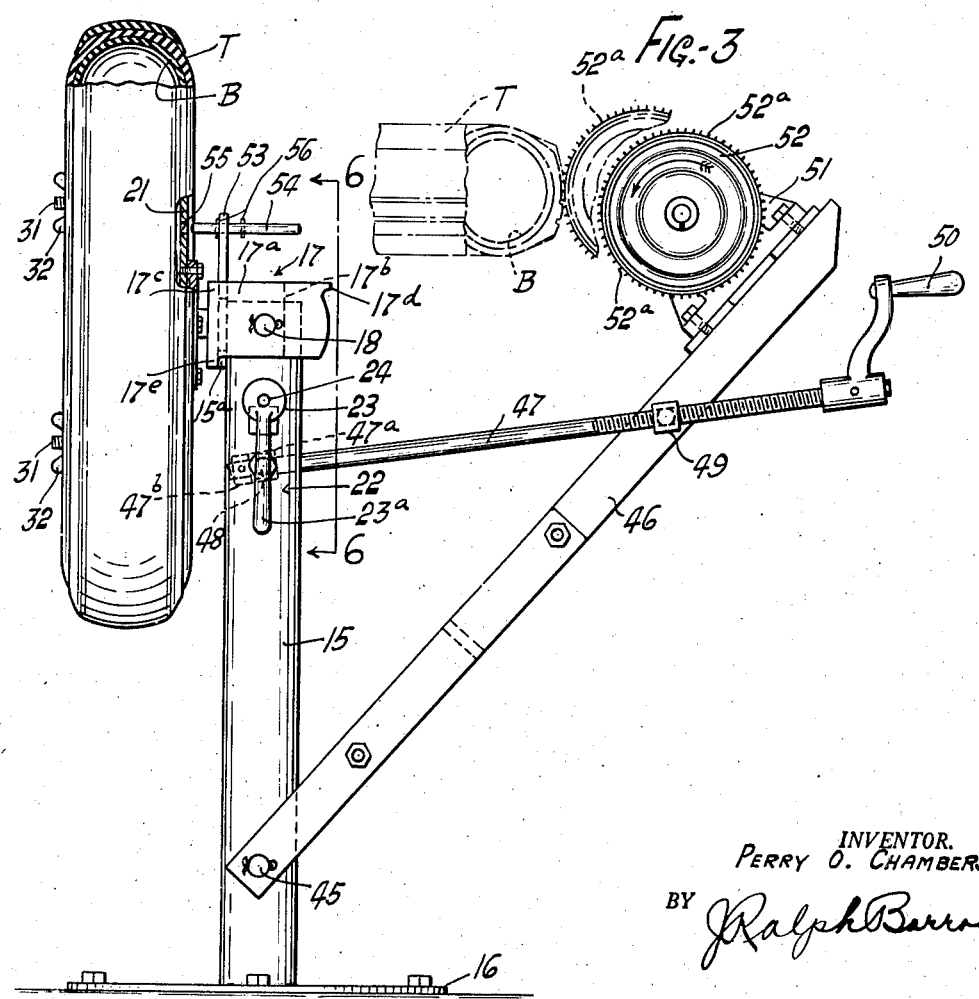
INVENTOR.
PERRY O. CHAMBERS
BY J Ralph Barrow

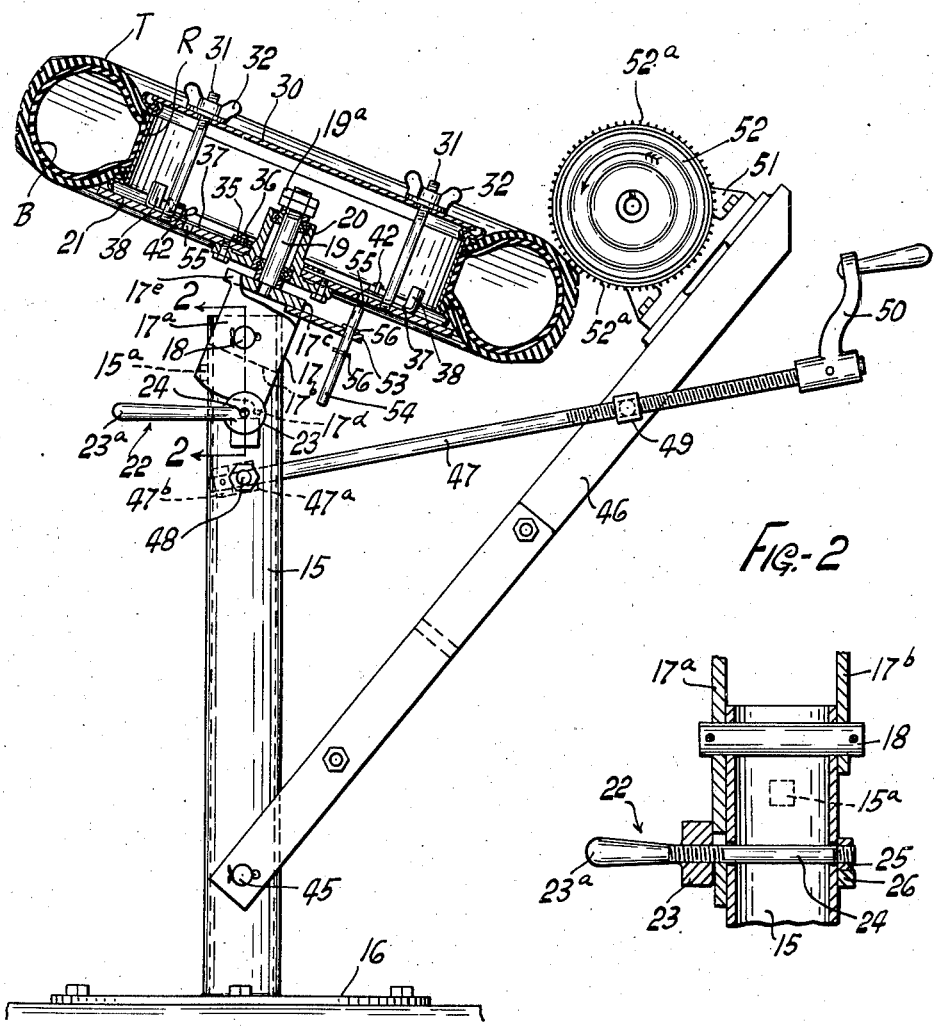

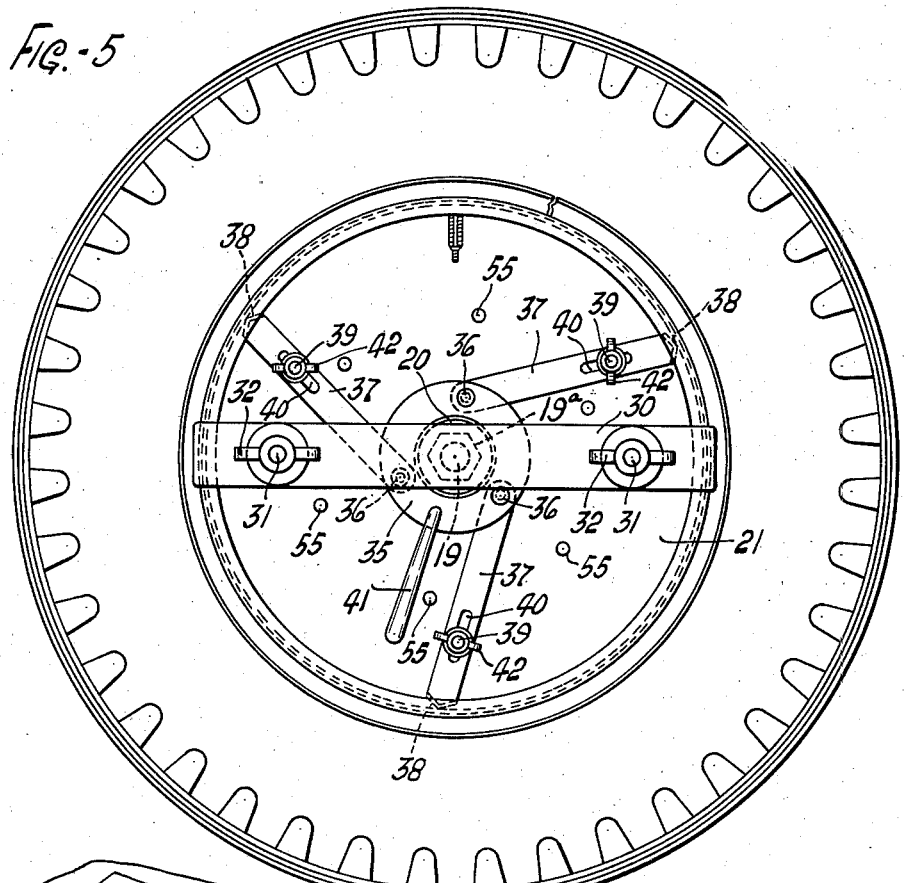
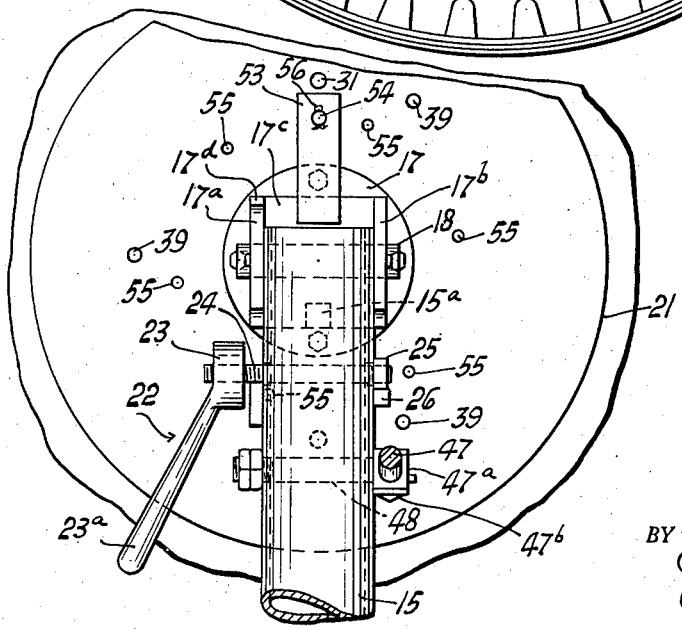

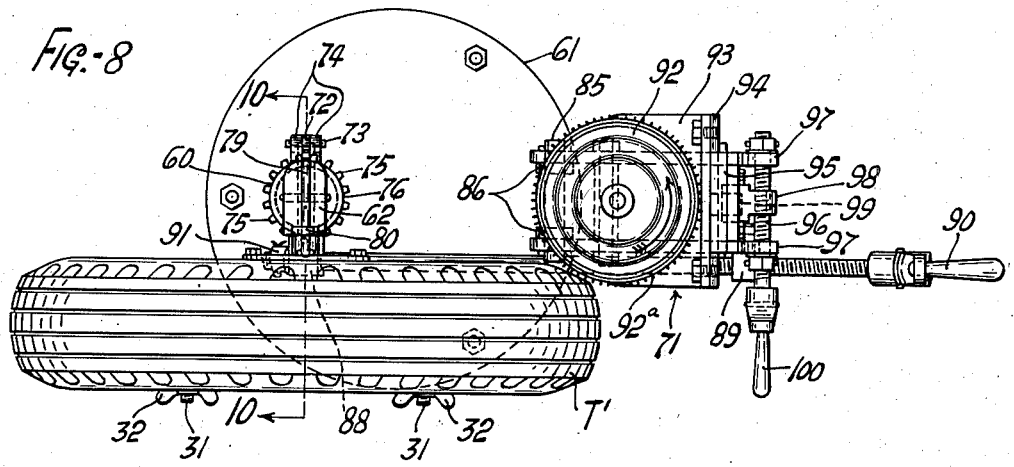

Jan. 2, 1945. P. O. CHAMBERS 2,366,685
TIRE BUFFING AND REBUILDING MACHINE
Filed July 8, 1941 5 Sheets-Sheet 5

INVENTOR.
PERRY O. CHAMBERS
BY JRalphBarrow

Patented Jan. 2, 1945

2,366,685

UNITED STATES PATENT OFFICE 2,366,685

TIRE BUFFING AND REBUILDING MACHINE

Perry O. Chambers, Chicago, Ill., assignor to Safety Vulcanizer Company, Chicago, Ill., a corporation of Illinois Application July 8, 1941, Serial No. 401,481

12 Claims. (Cl. 29—76)

This invention relates to apparatus for buffing the worn tread rubber from pneumatic tires and replacing the same with new tread stock.

Heretofore, apparatus of the character described has been provided, but has not been entirely satisfactory from the standpoint of small tire repair establishments, because separate units were required for the tire buffing and tread rebuilding operations. Such separate units required separate floor space, a consideration which frequently deterred small establishments, such as garages, service stations, etc., from installing tire repair equipment. The relatively high initial cost of installing separate buffing and tread rebuilding units has been another consideration which has prevented a relatively wider establishment of tire repair business in the past.

An object of this invention is to provide a unitary machine of the character described on which may be performed both the tire tread buffing and the tread rebuilding operations, the usual necessity of providing separate machines for these operations being obviated.

Another object of this invention is to provide a simple, compact machine of the character described which will be available to tire repair establishments at relatively low cost.

Another object of the invention is to provide a machine of the character described in which a turntable for mounting a tire to be buffed is so adjustable with respect to a buffing tool as to obviate the usual necessity of removing and repositioning the tire on the turntable, to present opposite portions of the tire advantageously to the buffing tool, and in which the turntable may be adjusted to be in a vertical plane for the purpose of applying new tread rubber stock to the buffed tire.

These and other objects of the invention will be manifest from the following brief description and the accompanying drawings.

Of the accompanying drawings:

Figure 1 is a side elevation, partly broken away and in section, of a combined tire buffing and tread-rebuilding machine embodying one form of the invention, the machine being shown in condition for an initial buffing operation.

Figure 2 is an enlarged fragmentary cross-section taken on line 2—2 of Figure 1.

Figure 3 is a view similar to Figure 1, particularly illustrating the machine with a tire in position for performing a tread-rebuilding operation.

Figure 4 is a plan view, partly broken away, of the machine as shown in Figure 3.

Figure 5 is a plan view of the turntable with a tire mounted thereon, on an enlarged scale, as viewed in Figure 1.

Figure 6 is a fragmentary cross-section, on an enlarged scale, taken substantially on the line 6—6 of Figure 3.

Figure 7 is a side elevation of a combined tire buffing and tread-rebuilding machine embodying another form of the invention.

Figure 8 is a plan view of Figure 7 illustrating a tire in an initial buffing position with respect to a buffing tool.

Figure 9:
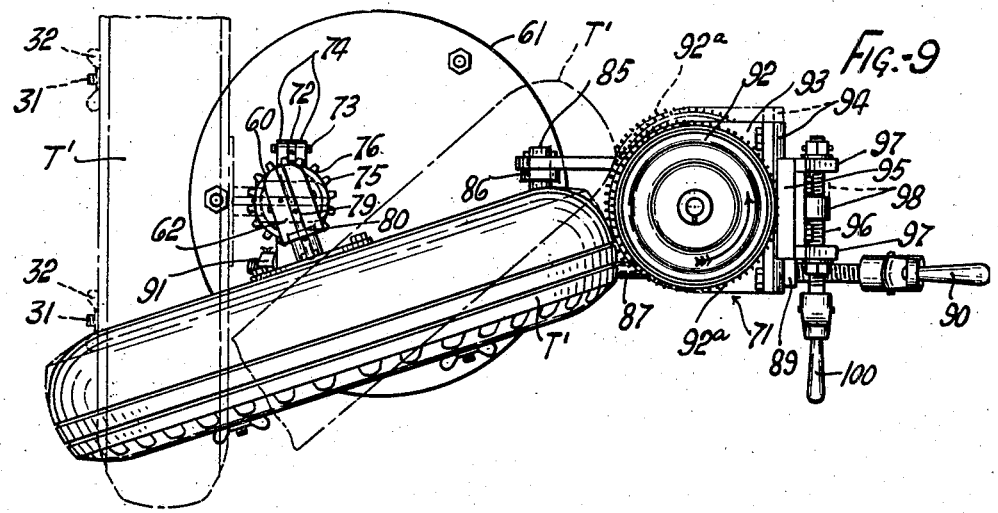
Figure 9 is a plan view similar to Figure 8, but illustrating the tire in an intermediate buffing position.
Figure 10:
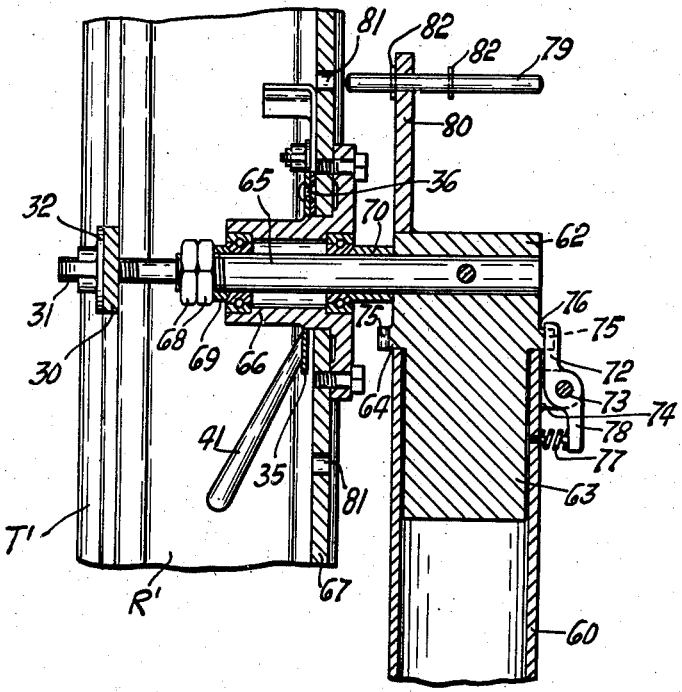
Figure 10 is a fragmentary cross-section, on an enlarged scale, taken substantially on the line 10—10 in the Figure 8.

Referring to the embodiment of the invention shown in Figures 1 to 6, the numeral 15 designates a post or upright having a base 16, which may be bolted to a floor to hold the post securely in vertical position. A U-shaped bracket or head 17 may be pivoted on a pin 18 extended through the post and apertures in spaced legs 17$^a$ and 17$^b$ of said bracket; these legs straddling the top of the post; and from a cross-piece 17$^c$ on the bracket may extend a spindle 19, on which is journalled a bearing 20 of a turntable 21 for mounting thereon, in a manner to be described, a tire T to be buffed and rebuilt with new tread rubber stock. Nut 19$^a$ is threaded on spindle 19 to retain the turntable thereon.

For firmly holding the bracket in various angularly adjusted positions in a vertical plane, one leg 17$^a$ thereof may be longer than the other to be clamped against the post at various points at the end thereof by means of a clamping device indicated generally at 22. The clamping device 22 may comprise a nut 23 threaded on one end of a pin or bolt 24 extending through suitable apertures in post 15, the other end of the pin having adjustably secured thereon a square head 25 which normally prevents the pin from turning by having one edge face thereof engaging a block or boss 26 on the post 15. The nut 23 has a handle 23$^a$ extending therefrom, to facilitate turning the nut on pin 24 against portions of the end of the leg 17$^a$ of bracket 17, thereby to clamp the same firmly against the post. By means of clamping device 22 the turntable may be fixed in various angular positions with respect to the horizontal, for the tire buffing operations subsequently to be described. The square head 25 is adjustable longitudinally on the pin 24 to regulate the angular position of the clamping nut handle 23ª to be within constant convenient reach of the operator. The outer end of leg 17ª of the bracket is curved substantially on a radius from pivot 18 so that it may swing freely past the pivot 24 of the clamping device 22. A projection 17ᵈ at one corner of leg 17ª is adapted to engage pin 24 to limit the swing of the turntable in one direction beyond a substantial angle below a horizontal tire buffing position, and a projection 17ᵉ on cross-piece 17ᶜ is engageable with a block on bar 15ª on post 15 to limit the swing in the opposite direction beyond a vertical plane for the tire rebuilding operations, as will be described later.

A tire T mounted on a rim R of known type with a pressure bag B within the tire casing, preferably inflated to about ten pounds per square inch, may be releasably clamped on turntable 21 by means of a bar 30 placed across diametrically opposite outer edge portions of the rim, as shown in Figures 1 and 5, pins 31, 31 on the turntable extending outwardly through apertures in the bar, and being adapted to have thumb screws 32, 32 threaded on the outer ends thereof to apply clamping pressure to the bar.

Releasable means for centering the rim and tire assembly on the turntable 21 is best shown in Figures 1 and 5. This may comprise a ring 35 mounted to rotate about bearing 20, there being pivoted thereon at spaced points 36, 36 a plurality of bars 37, 37 extending radially outwardly which have angularly extending end portions 38 for engaging the inner periphery of the rim at spaced points. The bars 37 are guided by means of threaded pins 39 fixed on the inner face of the turntable and extending through slots 40 in the bars. A radially extending handle 41 is provided on the ring 35, whereby the ring may be turned in clockwise direction, as viewed in Figure 5, to move the pivots 36 in arcs and thereby to urge the bars 37 substantially radially outwardly, as guided by the pins 39 in slots 40, to engage the end portions 38 with the inner periphery of the rim R. Equalized force will thus be applied to the bars 37 to center the rim with respect to the spindle 19 of the turntable, the centering means, of course, being operated while the clamping bar 30 is not under full clamping pressure of thumb screws 32. Wing nuts 42, 42 may be threaded on the pins 39 for clamping the bars 37 against the turntable 21, thereby to fix the bars in said outward centering positions. Conversely the centering means may be released by releasing the wing nuts 42 and turning ring 35 in counter-clockwise direction, by means of handle 41, to urge the bars 37 inwardly of the rim R.

Pivotally mounted on a pin 45 extended through post 15 adjacent the lower end thereof may be a frame 46 which extends angularly upwardly, as shown in Figure 1, and which is angularly adjustable with respect to the post 15 by means of rod 47 rotatably received through a block 47ª pivotally connected to the end of a pin 48 which is rotatably received through said post at a point intermediate the turntable pivot 18 and the pivot pin 45, said rod being threaded at the free end portion thereof through a nut 49 pivoted on one side of frame 46. The weight of frame 46 is supported by a block 47ᵇ on the pivot end of rod 47 engaging the pivot block 47ª. Secured on the outer end of the rod 47 is a crank handle 50 for turning the rod relative to the pivot block 47ª, whereby the nut 49 travelling on the threaded portion of the rod will cause angular adjustment of the frame 46 with respect to the post in vertical plane parallel to the plane of movement of turntable bracket 17 on pivot 18.

Mounted at the upper end of frame 46 may be a suitable motor 51 on the driven shaft of which is keyed the standard rotary type of tack rasp or buffer 52 adapted to be arcuately adjusted toward and from buffing contact with tire T mounted on the turntable 21, by turning handle 50 on rod 47 to swing frame 46 on its pivot 45. The tacks or pins 52ª, 52ª on the rasp preferably are in helically arranged rows so as to impart rotary movement to the turntable 21 on spindle 19, upon the rasp engaging the tire T, by virtue of the turntable being rotatable on spindle 19 in various planes, as the turntable is adjusted on pivot 18 through clamping nut 23, in which planes the path of rotation of the rasp 52 crosses or intercepts the peripheral portions of the tire being buffed.

For the purpose of applying rubber stock, commonly called "camelback," to the buffed area of the tire, it is essential that the tire be arranged to rotate in a vertical plane. To this end, the turntable may be swung on pivot 18, until it reaches the vertical position shown in Figures 3 and 4, as limited by an overhanging portion 17ᵉ on the cross-piece 17ᶜ (Figure 3) of U-bracket 17 engaging stop bar 15ª on post 15.

It is also essential when applying the "camelback" that the turntable 21 be periodically held in non-rotative condition, in order that the operator may use both hands progressively to apply the "camelback" in centered relation around the buffed area of the tire. For this purpose a bar 53 may extend from cross-piece 17ᶜ of bracket 17 parallel with the turntable 21, and a pin 54 is slidably received through an aperture in said bar to be engageable at will in one of a plurality of circumferentially spaced apertures 55, 55 in said turntable. Insertion of pin 54 in one of the openings 55 prevents rotation of the turntable on spindle 19. Spaced cotters 56, 56 are provided in pin 54 shiftably to retain the same on bar 53.

In the operation of the machine shown in Figures 1 to 6 the operator preferably sits or stands at the near side of the machine as viewed in Figure 1, for example, the tire T mounted on rim assembly R having been centered on the turntable 21 by turning ring 35, by means of handle 41, to urge the bars 37 radially outwardly into engagement with the inner periphery of the rim, and bar 30 having been clamped across the outer edge portions of the rim by means of thumb-screws 32 on pins 31, for clamping the rim to the turntable. Next, the operator, through the clamping nut 23 engaging the leg 17ª of bracket 17 against post 15, fixes the turntable at an initial tire buffing angle, substantially as shown in Figure 1. By turning the handle 50, frame 46 may be angularly adjusted to swing the tack rasp 52 in an arc about pivot 45, and thereby to engage the top side of the tire to sufficient depth, as determined by trial, the motor 51, of course, being continuously driven. While the buffer or rasp 52 is thus held against the tire the operator may manually turn the turntable 21 in one direction on spindle 19, against the tendency of the spiral rows of tacks or teeth 52ª on the buffer to cause rotation of the turntable in the opposite direction, or the buffer may be allowed to turn the turntable in said opposite direction against a braking action applied by the operator holding his hand or hands on the tire. Similarly, by progressively adjusting and clamping the turntable at various angles toward a horizontal position shown in chain-dotted lines in Figure 3 the handle 50 may be progressively turned in proper direction to cause the buffer 52 to make contiguous annular cuts of desired depth, thereby to remove a desired amount of old tread rubber in accordance with a template of predetermined contour (not shown).

When the tire has been buffed to the central tread portion of the tire T, the buffer may be backed away to permit reversal of the tire on the turntable 21, the rim R being centered and clamped thereon as previously described, after which the above described buffing operations may be performed to buff from the other side of the tire to the center of the tread.

After the tire T has been completely buffed in the above described manner, the clamp 23 is released to permit the tire and turntable to be swung on pivot 18 to vertical position, as shown in Figures 3 and 4, the end of pin 54 being engaged in an opening 55 in the turntable to hold the same in non-rotative position on spindle 19. In this fixed position the operator, starting at the top of the tire, may place the end portion of a predetermined length of raw rubber tread stock or "camelback" thereon, rubber cement or like adhesives having been previously applied to the buffed areas of the tire, in accordance with the usual practice. By progressively turning the turntable on spindle 19, and periodically locking it in fixed positions by means of pin 54, the operator may progressively place or build "camelback" completely around the buffed portion of the tire. The ends of the length of "camelback" are then spliced together with a suitable hand tool, after which the operator may freely rotate the turntable 21, with one hand, the pin 54 being in released position, while he utilizes his other hand to roll down the "camelback" with suitable hand rolls (not shown).

Referring now to the modified form of the invention shown in Figures 7 to 10, the numeral 60 indicates a tubular post or upright having a base 61 for firmly bolting the same to a floor. A head 62 may be rotatably supported on the upper end of post 60 by a reduced portion 63 extending into the hollow end of the post and providing an annular shoulder portion 64 which engages the upper rim of the post (see Figure 10). Non-rotatably secured in said head to extend outwardly thereof substantially at right angles to the axis of the post may be a pin 65, which journals on a central bearing 66 secured on a turntable 67, similar to the turntable 21 previously described in connection with Figures 1 to 6, for mounting a tire and rim assembly. The turntable is retained on the shaft 65 by nuts 68 threaded on the end of the shaft, suitable spacer sleeves 69 and 70 being provided, as shown, to space the turntable with respect to head 62. Thus the turntable 67 is rotatable in a vertical plane in all rotated positions of head 62 on post 60.

The mechanism for releasably centering and clamping a tire and rim assembly on the turntable 67 is substantially the same as previously described, particularly in connection with Figures 1 and 5, and hence, like parts are given like numerals.

The head 62 is rotatable through 360° on post 60 to swing the turntable 67 to various angular positions relative to a buffing device 71, to be described later, at one side of said post, as indicated in full and chain-dotted lines at the right of Figure 9, or to swing to a position at the other side of the post, as indicated in chain-dotted lines at the left of Figure 9, in which the tire T' on rim R' mounted on the turntable will be substantially unobstructed for applying new tread rubber stock or "camelback" onto the tire. For retaining the head 62 in these various rotatably adjusted positions a pawl 72, pivoted at 73 between spaced lugs 74 on post 60, may be normally yieldingly urged between adjacent teeth 75, 75 of a ratchet wheel 76, integral with head 62, by a compression spring 77 suitably retained between said post and an integral extension 78 from pawl 72.

For locking the turntable 67 against rotation on spindle 65 while applying new tread stock to a buffed tire, as previously described, a pin 79 is slidable in an aperture in a bar 80 extending upwardly from head 62 to be selectively engageable in one of a series of circumferentially spaced apertures 81, 81 in the turntable. Cotter pins 82, 82 are provided in pin 79 for limiting movement thereof in either direction.

For shiftably mounting a buffing device 71 in association with turntable 67, an upwardly extending frame 84 may be pivoted at one end on a pin 85 received through apertures in spaced lugs 86, 86 on base 61. The frame 84 is adjustable to swing on its pivot to shift buffing device 71 toward and from post 60, by means of a rod 87 rotatably received at one end in a block 88 pivoted on post 60, and threaded at its other end in a nut or block 89 pivoted on frame 84, a crank handle 90 being fixed on said threaded end for turning the rod. A nut 91 on the pivot end of rod 87 is always held against pivot block 88 by the weight of frame 84.

The buffing device 71 may comprise a rotary tack rasp 92 keyed on the driven shaft of motor 93, to rotate on a substantially vertical axis. Motor 93 may be secured on a slide member 94 which is transversely slidable in a slideway 95 mounted on the upper end of frame 84. A shaft 96 is rotatably supported between spaced sides 97, 97 of said frame, and has threaded thereon a traveler 98 which is secured to a portion 99 of slide 94 projecting through an aperture in slideway 95. Shaft 96 is rotatable, by means of a crank handle 100, secured on the forwardly projecting end thereof, to cause the traveler to move horizontally in one direction or the other along the threaded portion of the shaft, and thereby to shift the axis of rotation of the rasp or buffer 92 transversely of the plane of a tire T' on turntable 67, as best shown in full and chain-dotted lines at the right of Figure 9. This adjustment, combined with rotational movement of the head 62 on post 60, to change the transverse angle of the vertical plane of the tire T', and with adjustment of frame 84 toward and from post 60 by turning handle 90, to move the tack rasp 92 toward and from the path of tire T' as the turntable is manually rotated on spindle 65, makes it possible to engage the rotary tack rasp 92 with all portions of the tire tread and sidewalls usually buffed in preparation for application of the new tread rubber. It is not necessary, as in the first described form of the invention, to reverse the tire and rim assembly on turntable 67 to buff opposite side portions of the tire.

In the operation of the form of the invention just described, the operator first centers and clamps a tire T' mounted on a rim assembly R' onto the turntable 67, in the manner previously described. Next, the turntable is fixed in a vertical plane, substantially as shown in Figure 8, in which handle 90 may be turned to move tack rasp 92 inwardly to a starting position on one sidewall of the tire, and the handle 100 is turned to shift the slide member transversely in slideway 95 to adjust the depth of the cut to be made in the tire by the rasp. Motor 93 preferably is continuously driven during the buffing operations. The operator by engaging the tire T' with his hands may either rotate the turntable in spindle 65 in one direction, against the tendency of helically arranged rows of teeth 92ª on the rotating tack rasp to turn the tire in the opposite direction, or he may brake the tire, by holding his hands against the same in opposition to such tendency of the tire to rotate by said action of the tack rasp. Successive circumferential cuts are similarly made by the rotating tack rasp, while the turntable is progressively swung on post 60 through various angular positions to produce contiguous cuts of controlled depth to produce a buffed surface of desired contour.

In buffing the outer tread portion of the tire (see full lines in Figure 9) progressive circumferential cuts are made by operating the handle 100, while the turntable is swung on post 60 as before, the depth of the contiguous cuts then being determined by swinging the frame 84 on its pivot 85, by turning handle 90. The other sidewall of the tire is buffed by swinging the tire toward the chain-dotted position shown in Figure 9, in which the control handles 90 and 100 are operated substantially in the same manner as for the first described sidewall buffing operation. In other words, the tire T' may be completely buffed from one sidewall thereof to the other, by progressively swinging the tire through angles between the full line position of the tire shown in Figure 8 to the chain-dotted position thereof shown in Figure 9, while the depths of the buffing cuts are progressively controlled at various points by manipulating either of the operating handles 90 or 100, or combinations of both handles.

After the tire T' is completely buffed the pawl 72 may be released from ratchet 76 to permit swinging the turntable to position the tire in a vertical plane on the side of post 60 opposite from the buffing device 71, as indicated in chain-dotted lines in Figure 9. In this position the tire T' is relatively free and unobstructed for the purpose of applying the raw tread rubber stock thereto, and during the progressive tread applying steps, substantially as previously described in connection with Figures 1 to 6 of the drawings, the tire may be periodically held in fixed position by engaging pin 79 in one or other of the apertures 81 in the turntable 67 to prevent rotation thereof on its spindle 65. As before, the tread stock applied to the tire may be rolled down with a hand roll while the turntable is freely rotated.

Thus has been described two illustrative examples of simple, compact, economical, and efficient mechanisms in accordance with the stated objects of the invention. Modifications of the invention may be resorted to without departing from the spirit thereof or the scope of the appended claims.

What is claimed is:

1. A machine of the character described comprising a fixed upright, a head pivoted on said upright to swing in a substantially vertical plane, means for mounting a pneumatic tire to be rotatable therewith on said head in a plane substantially at right angles to said vertical plane, a support pivotally mounted in association with said upright, a rotary buffing tool mounted on said support, releasable means for retaining said head in various angularly adjusted positions on the pivot thereof to vary the angle of said plane of rotation of said tire-mounting means, means operable to adjust said support on its pivot for shifting said buffing tool toward or from a tire mounted on said tire-mounting means, said head-adjusting means and said support-adjusting means being adjustable to engage said buffing tool with the tire progressively to buff circumferential areas thereof as it is rotated with said tire-mounting means, said head being shiftable on its pivot to a position substantially remote from said buffing tool in which it is rotatable in a substantially vertical plane, means for retaining said head in said last-named position, and means selectively operable for locking said tire-mounting means against rotation relatively of said head.

2. A machine of the character described comprising a fixed upright, a head pivoted on said upright to swing in a substantially vertical plane, a turntable mounted on said head to rotate in a plane substantially at right angles to said vertical plane, means for mounting a pneumatic tire on said turntable, a support pivotally mounted in association with said upright, a rotary buffing tool mounted on said support, releasable means for retaining said head in various angularly adjusted positions on the pivot thereof to vary the angle of said plane of rotation of said turntable, means operable to adjust said support on its pivot for shifting said buffing tool toward or from a tire mounted on said turntable, said head-adjusting means and said support-adjusting means being adjustable to engage said buffing tool with the tire progressively to buff circumferential areas thereof as it is rotated with said turntable, said head being shiftable on its pivot to a position substantially remote from said buffing tool in which it is rotatable in a substantially vertical plane, means for retaining said head in said last-named position, and means selectively operable for locking said tire-mounting means against rotation relatively of said head.

3. A machine of the character described comprising a fixed upright, a head mounted on said upright to rotate through substantially 360° about a substantially vertical axis, a mounting for a pneumatic tire rotatable about a substantially horizontal axis on said head, a support shiftably mounted in association with said upright, a rotary buffing tool mounted on said support to rotate in a plane perpendicular to said upright and radial to a tire when brought into operating contact with it on said mounting, releasable means selectively operable to retain said head in various rotated positions about said vertical axis to vary the angle of the plane of rotation of said mounting with respect to said buffing tool, and means operable at will to shift said support to move said buffing tool toward a tire mounted on said mounting, said releasable means and said support-adjusting means being adjustable progressively to buff circumferential areas of a tire as it is rotated with said mounting.

4. A machine of the character described comprising a fixed upright, a head mounted on said upright to rotate about a substantially vertical axis, a mounting for a pneumatic tire rotatable about a substantially horizontal axis on said head, a support shiftably mounted in association with said upright, a rotary buffing tool mounted on said support, releasable means selectively operable to retain said head in various rotated positions about said vertical axis to vary the angle of the plane of rotation of said mounting with respect to said buffing tool, means operable at will to shift said support to move said buffing tool toward a tire mounted on said mounting, said releasable means and said support-adjusting means being adjustable progressively to buff circumferential areas of a tire as it is rotated with said mounting, said head being rotatable about said vertical axis to a point substantially unobstructed by said buffing tool in which it is rotatable in a substantially vertical plane about said horizontal axis, said releasable means being operable to lock said head in said last-named position, and means selectively operable for locking said mounting against rotation relatively of said head in said last-named position.

5. A machine of the character described comprising a fixed upright, a head mounted on said upright to rotate about a substantially vertical axis, a mounting for a pneumatic tire rotatable about a substantially horizontal axis on said head, a support pivotally mounted in association with said upright, a rotary buffing tool mounted on said support, releasable means selectively operable to retain said head in various rotated positions about said vertical axis to vary the angle of the plane of rotation of said mounting with respect to said buffing tool, and means operable at will to shift said support on its pivot to move said buffing tool toward a tire mounted on said mounting, said releasable means and said support-adjusting means being adjustable progressively to buff circumferential areas of a tire as it is rotated with said mounting.

6. A machine of the character described comprising a fixed upright, a head mounted on said upright to rotate about a substantially vertical axis, a mounting for a pneumatic tire rotatable about a substantially horizontal axis on said head, a support pivotally mounted in association with said upright, a rotary buffing tool mounted on said support, releasable means selectively operable to retain said head in various rotated positions about said vertical axis to vary the angle of the plane of rotation of said mounting with respect to said buffing tool, means operable at will to shift said support on its pivot to move said buffing tool toward a tire mounted on said mounting, said releasable means and said support-adjusting means being adjustable progressively to buff circumferential areas of a tire as it is rotated with said mounting, said head being rotatable about said vertical axis to a point substantially unobstructed by said buffing tool in which it is rotatable in a substantially vertical plane about said horizontal axis, said releasable means being operable to lock said head in said last-named position, and means selectively operable for locking said mounting against rotation relatively of said head in said last-named position.

7. A machine of the character described comprising a fixed upright, a head mounted on said upright to rotate about a substantially vertical axis, a turntable mounted on said head to rotate about a substantially horizontal axis, means for releasably mounting a pneumatic tire on said turntable, a support pivotally mounted in association with said upright, a rotary buffing tool mounted on said support, releasable means selectively operable to retain said head in various rotated positions about said vertical axis to vary the angle of the plane of rotation of said turntable with respect to said buffing tool, and means operable at will to shift said support on its pivot to move said buffing tool toward a tire mounted on said turntable, said releasable means and said support-adjusting means being adjustable progressively to buff circumferential areas of a tire as it is rotated with said turntable.

8. A machine of the character described comprising a fixed upright, a head mounted on said upright to rotate through substantially 360° about a substantially vertical axis, a mounting for a pneumatic tire rotatable about a substantially horizontal axis on said head, a support shiftably mounted in association with said upright, a rotary buffing tool mounted on said support to rotate in a plane perpendicular to said upright and radial to a tire when brought into operating contact with it on said mounting, releasable means selectively operable to retain said head in various rotated positions about said vertical axis to vary the angle of the plane of rotation of said mounting with respect to said buffing tool, said buffing tool being shiftable on said support transversely of the plane of movement of said support, means operable to adjust said buffing tool transversely on said support, and means operable at will to shift said support to move said buffing tool toward a tire mounted on said mounting, said releasable means and said support-adjusting means being adjustable progressively to buff circumferential areas of a tire as it is rotated with said mounting.

9. A machine of the character described comprising a first upwardly extending support, a head mounted on said support to swing about a relatively fixed horizontal axis, a mounting for a pneumatic tire rotatable on said head in a plane about an axis angularly of a plane through said fixed axis, a second upwardly extending support, a rotary buffing tool mounted on said second support, one of said supports being pivoted at its lower end to be shiftable toward and from the other, means for adjusting the position of said head with respect to said fixed axis thereof to vary the angle of said plane of rotation of said mounting between substantially horizontal positions with respect to said tool and a substantially vertical position on a side of said first support remote from said tool, means for retaining said head with said tire mounting means in said vertical position of tire mounting means, and means for relatively adjusting said pivoted support toward and from the other support, said head-adjusting means and said support-adjusting means being progressively adjustable to engage said buffing tool with a tire in said horizontal positions of said mounting progressively to buff circumferential areas of the tire as it is rotated with the mounting about said axis thereof.

10. A machine of the character described comprising a pair of supports relatively shiftable toward and from each other, a head mounted on one of said supports to rotate through substantially 360° about a substantially vertical axis, a mounting for a pneumatic tire rotatable about a substantially horizontal axis on said head, a rotary buffing tool mounted on the other of said supports to rotate in a plane perpendicular to said first-mentioned support and radial to a tire when brought into operating contact with it on said mounting, releasable means selectively operable to retain said head in various rotated positions about said vertical axis to vary the angle of the plane of rotation of said mounting with respect to said buffing tool, and means operable at will to move said supports relatively of each other with respect to a tire on said mounting, said releasable means and said support-moving means being adjustable progressively to buff circumferential areas of a tire as it is rotated with said mounting.

11. A machine of the character described comprising means for mounting a tire to rotate about its axis, means comprising a fixed support for supporting said mounting means so as to be movable between two positions in which the tire may be rotated with its axis located in two relatively remote planes and with its axis in different planes, adjacent to one of said relatively remote planes a tool for operating upon said tire while rotated in or adjacent to the aforesaid one remote plane, means for mounting said tool so as to be movable toward and from engagement with a tire rotating in or adjacent to the aforesaid one remote plane and while shifted between adjacent planes, said tire being rotatable in the other remote plane clear of said tool and its mounting, and means for securing the tire mounting whereby the tire may be rotated in said other remote plane for performing operations on said tire while so rotated.

12. A machine of the character described comprising means for mounting a tire to rotate about its axis, means comprising a fixed support for supporting said mounting means so as to be movable between two positions in which the tire may be rotated with its axis located in two relatively remote planes and with its axis in different planes, adjacent to one of said relatively remote planes, a tool for operating upon said tire while rotated in or adjacent to the aforesaid one remote plane, means for mounting said tool so as to be movable toward and from engagement with a tire rotating in or adjacent to the aforesaid one remote plane and while shifted between adjacent planes, said tire being rotatable in the other remote plane clear of said tool and its mounting, and means for securing the tire mounting whereby the tire may be rotated in said other remote plane for performing operations on said tire while so rotated, said tool comprising a rotary buffer operable to and from engagement with the tread portion of a tire when rotating with its axis in or adjacent to the aforesaid one remote plane said tire mounting being adapted to permit rotation of said tire in said other remote plane to apply tire-building material to the tire.

PERRY O. CHAMBERS.